(No Model.)
D. R. VIVION.
CORN PLANTER.
No. 374,218. Patented Dec. 6, 1887.
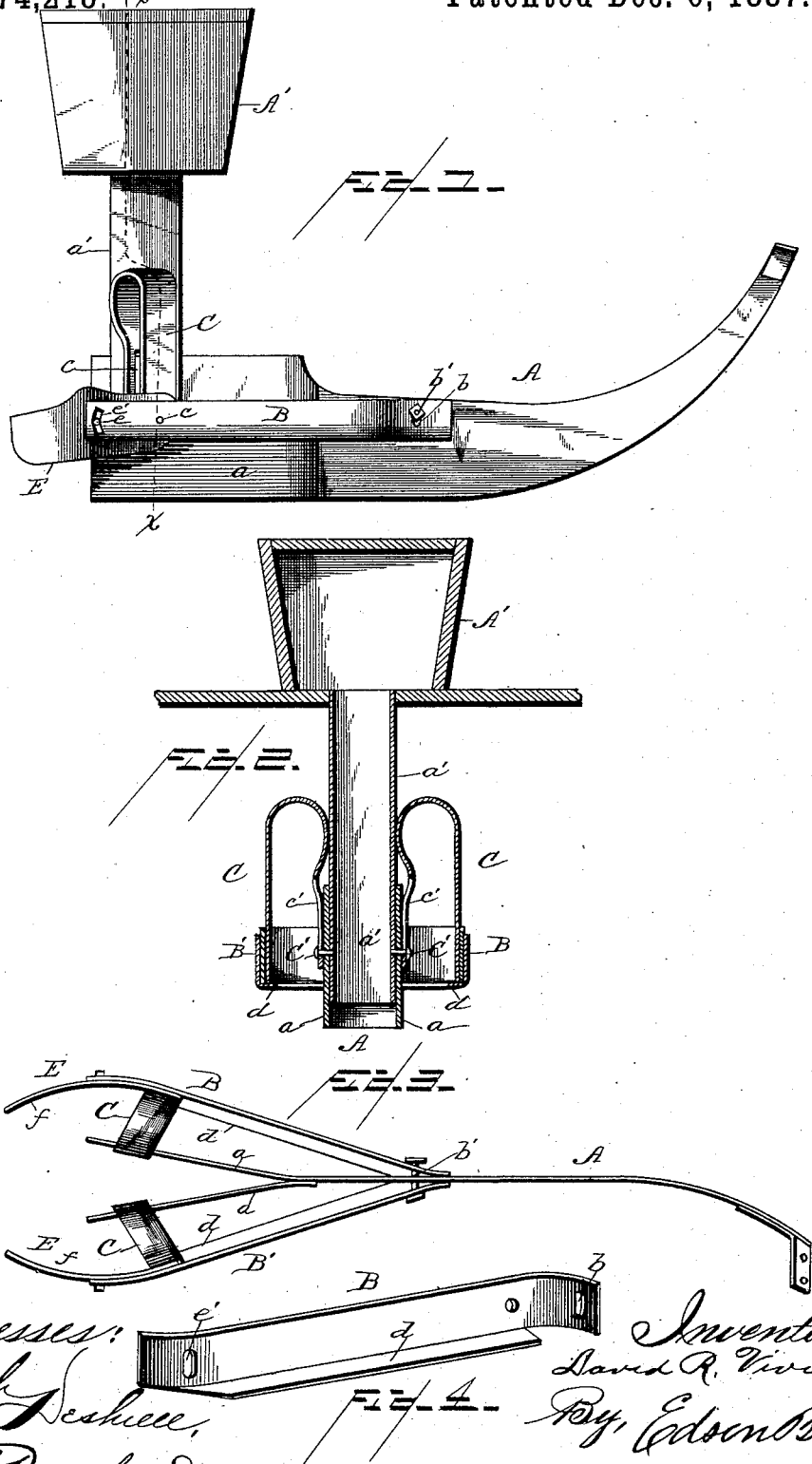

UNITED STATES PATENT OFFICE.

DAVID R. VIVION, OF McCREDIE, MISSOURI.

CORN-PLANTER.

SPECIFICATION forming part of Letters Patent No. 374,218, dated December 6, 1887.

Application filed April 5, 1887. Serial No. 233,732. (No model.)

*To all whom it may concern:*

Be it known that I, DAVID R. VIVION, a citizen of the United States, residing at McCredie, in the county of Callaway and State of Missouri, have invented certain new and useful Improvements in Corn-Planters, of which the following is a specification, reference being had therein to the accompanying drawings.

My invention relates to improvements in corn-planters; and it consists of the peculiar combination of devices and novel construction and arrangement of parts, as will be hereinafter fully set forth, and particularly pointed out in the claims.

The present invention is especially designed as an improvement upon the corn-planter patented to me on the 28th day of August, 1877, and numbered 194,745; and it has primarily for its object to provide an improved gage-plate which is independently adjustable at both ends to regulate the depth which the opener penetrates the ground.

A further object of my present invention is to provide the regulating-blades with mechanism for normally forcing the same away from the opener to thereby provide a large space into and through which large "clods" or solid masses of earth enter, so as to be subjected to the action of the pulverizing or crushing devices; and, finally, the object of my invention is to provide an improved covering-blade, which is carried by the gage-plates, for covering the seeds to any given depth, and to make the said blade adjustable independently on the gage-plate to thereby regulate the depth which the seeds are covered.

In the accompanying drawings, Figure 1 is a side elevation of a portion of the corn-planter embodying my invention. Fig. 2 is a vertical transverse sectional view on the line $x$ $x$ of Fig. 1. Fig. 3 is a top plan view with the hopper and conducting tube or spout removed, and Fig. 4 is a detail perspective view of one of the gage-plates.

Referring to the drawings, in which like letters of reference denote corresponding parts in all the figures, A designates the furrow-opener of a corn-planter of any ordinary or preferred pattern. The rear end of the opener is expanded or bifurcated at $a$ to conform to the shape of the lower extremity of the vertically-disposed conducting tube or spout $a'$, which leads from the hopper A' in the ordinary well-known manner.

B B' designate the gage-plates, which are arranged on opposite sides of the opener, and which extend laterally in opposite directions from the same. The front ends of these gage-plates are each provided with communicating apertures $b$, which are arranged one above the other, and the front ends of the said gage-plates are adjusted so that the openings therein align with a corresponding opening in the opener, which is formed therein at a point in the front of the bifurcated portion $a$. A nutted bolt, $b'$, is passed through the aligned opening $b$ of the gage-plates and opener to securely connect the parts together, and the bolt may be passed through either of the openings to thereby permit the front ends of the gage-plates to be adjustably connected to the opener. In lieu of the openings a single continuous slot may be formed in each of the plates, as is obvious.

Between the rear ends of the gage-plates and the opener A are interposed springs C, which are preferably of a shape approximating an inverted U. The free end of one leg of one of these springs is permanently connected, by a bolt or rivet, $c$, with the rear extremity of one of the gage-plates, and the free end of the other leg of the spring is provided or formed with a longitudinal slot, $c'$, through which is passed a nutted bolt, C', which thereby adjustably connects the spring to the opener at the rear terminal of the bifurcated or expanded portion thereof. These U-shaped springs are extended or projected above the gage-plates, and they normally force or press the rear ends of the said plates away from the opener. The front ends of the gage-plates are loosely connected to the opener by the through-bolt, so as to permit the plates to yield or move freely in horizontal planes toward and from the opener.

It will noted that the gage-plates are connected to the opener a considerable distance above the lower edge of the latter and at or near the upper edge of the same, so as to permit the opener to penetrate or enter the ground to the desired depth to properly plant or deposit the seeds, and that the gage-plates can be adjusted vertically on the opener to vary the depth which the latter penetrates the ground. This vertical adjustment of the gage-plates can be secured either by loosening the front bolt, $b'$, and thereby raise or lower the front ends of one or both of the gage-plates, or the bolt $C'$ can be loosened to permit the springs C and the rear ends of the gage-plates to be adjusted, the rear ends of the plates moving with the spring, as these parts are permanently connected together, while the spring and the opener are adjustably and detachably connected by the bolts $C'$, as is obvious.

Each gage-plate is further provided with a horizontal ledge or flange, $d$, which projects inwardly toward the opener, and is preferably formed by bending the lower edge of the plate, these flanges assisting the gage-plates in pulverizing or breaking the large lumps or clods of earth encountered by the opener in moving over the ground.

By means of the springs the laterally movable or expansible gage-plates are normally pressed or forced away from the opener, to thereby provide or leave comparatively large spaces between the opener and blade, through which obstructions—such as rocks or cornstalks—are free to pass without damage, or when the plates strike an immovable object or obstruction lying in the path of the same, they swerve to one side and compress the springs, and thereby avoid damage or breakage to the parts.

E are the covering-blades, which are carried by the rear ends of the gage-plates. Each of the covering-blades is pivotally connected to the gage-plates by the same bolt or rivet that connects the spring and gage-plate together, and each blade is provided on its outer side with a fixed stud or boss, $e$, which fits and rides in a slot, $e'$, which is formed transversely in the rear end of the gage-plate, and thereby permits the blade to be adjusted vertically on the gage-plate independently of the latter, to thus cover the seeds with fine pulverized soil to varying depths. The rear ends of these blades are curved or inclined inwardly toward each other, as at $f$, to adapt them to preferably throw the dirt or soil upon the seeds.

The operation of my invention will be readily understood from the foregoing description, taken in connection with the drawings.

It will be noted that I provide improved means for regulating the depth which the furrow enters the ground, which readily adjust themselves to any obstruction in the path of the furrow to avoid the same, and thereby prevent damage to the parts, and also provide covering devices which can be easily adjusted to cover the seeds with the soil at different depths.

My devices are simple and durable in construction, exceedingly efficient and reliable in operation, and comparatively cheap.

Having thus fully described my invention, what I claim as new, and desire to secure by Letters Patent, is—

1. The combination, with an opener, of the laterally-movable gage-plates carried by the opener and the springs for normally pressing the gage-plates away from the opener, as and for the purpose described.

2. The combination, with an opener, of the laterally-movable gage-plates connected at their front ends to the opener and the springs connecting the rear ends of the plates with the opener, as and for the purpose described.

3. The combination, with an opener, of a laterally-movable gage-plate carried by the opener and a spring for normally forcing the gage-plate out of contact with the opener, as and for the purpose described.

4. The combination, with an opener, of a laterally-movable gage-plate and a spring intermediate of the gage-plate and opener, one end of the spring being permanently connected to the opener and the other end adjustably connected to the gage-plate, substantially as described.

5. The combination, with an opener, of the laterally-movable gage-plate and an inverted-U-shaped spring having one arm permanently connected with the gage-plate and its other arm detachable and adjustably connected by a bolt-and-slot connection with the opener, substantially as described.

6. The combination, with an opener, of the spring-pressed gage-plates and the covering-blades carried by the gage-plates and projecting rearwardly therefrom, substantially as described.

7. The combination, with an opener, of the spring-pressed gage-plates adjustably connected to the opener and the covering-blades pivotally connected to the rear extremities of the gage-plates, substantially as described.

8. The combination, with an opener, of the spring-pressed gage-plates and the covering-blades having a pivot and slotted connection at different points of its length with the gage-plates, the said covering-blades converging inwardly toward each other, substantially as described.

In testimony whereof I affix my signature in presence of two witnesses.

DAVID R. VIVION.

Witnesses:
FIELDING M. BUSH,
ISAAC HOCKADAY.